United States Patent [19]
Colmant et al.

[11] Patent Number: 5,604,742
[45] Date of Patent: Feb. 18, 1997

[54] COMMUNICATIONS SYSTEM AND METHOD FOR EFFICIENT MANAGEMENT OF BANDWIDTH IN A FDDI STATION

[75] Inventors: Michel M. Colmant, Kain, Belgium; William A. McIntosh, Herndon, Va.; Alexander A. Smith, Carrollton, Tex.

[73] Assignee: International Business Machines Corporation, Armonk, N.Y.

[21] Appl. No.: 456,150

[22] Filed: May 31, 1995

[51] Int. Cl.⁶ ............................................. H04L 12/417
[52] U.S. Cl. ........................... 370/396; 370/453; 370/468; 370/906; 370/412
[58] Field of Search ................... 370/85.1, 85.4, 370/85.5, 85.6, 85.7, 94.2, 95.1, 60.1, 85.15, 61; 340/825.05, 825.5; 395/200.2, 200.21

[56] References Cited

U.S. PATENT DOCUMENTS

| | | |
|---|---|---|
| 4,539,679 | 9/1985 | Bux et al. . |
| 4,586,175 | 4/1986 | Bedard et al. ................. 340/825.5 |
| 4,665,518 | 5/1987 | Champlin et al. . |
| 4,763,321 | 8/1988 | Calvignac et al. . |
| 4,843,606 | 6/1989 | Bux et al. ....................... 370/85.4 |
| 4,862,451 | 8/1989 | Closs ............................. 370/60 |
| 4,866,704 | 9/1989 | Bergman ....................... 370/85.5 |
| 5,043,981 | 8/1991 | Firoozmand et al. ........... 370/85.1 |
| 5,206,857 | 4/1993 | Farleigh ........................ 370/85.5 |
| 5,208,809 | 5/1993 | Fergeson et al. .............. 370/85.12 |
| 5,245,605 | 9/1993 | Ofek ............................ 370/85.12 |
| 5,341,374 | 8/1994 | Lewen et al. .................. 370/85.4 |
| 5,383,186 | 1/1995 | Shin et al. ..................... 370/85.5 |
| 5,390,182 | 2/1995 | Zheng ........................... 370/85.5 |
| 5,392,280 | 2/1995 | Zheng ........................... 370/60 |

*Primary Examiner*—Douglas W. Olms
*Assistant Examiner*—Chau T. Nguyen
*Attorney, Agent, or Firm*—Joseph C. Redmond, Jr.; John D. Flynn

[57] ABSTRACT

A communication adapter transfers synchronous or multimedia and asynchronous or packet data between a network which may be of a FDDI type and a host system in real time. The adapter can manage data transfer in both directions between the system and the network and automatically switches between multimedia and packet data while holding the token. The adapter includes a queue manager having a synchronous threshold register and counter and a packet data threshold register and counter. The queue manager is coupled among a host bus; a storage means; a FDDI network; and bandwidth control logic. The queue manager in conjunction with the bandwidth control logic can dynamically switch the adapter from transmitting packet or synchronous data to the FDDI without exceeding bandwidth. The queue manager is also adapted to initiate capture of the token on a FDDI and commence transmission of synchronous or packet data frames to the ring as early as possible.

19 Claims, 14 Drawing Sheets

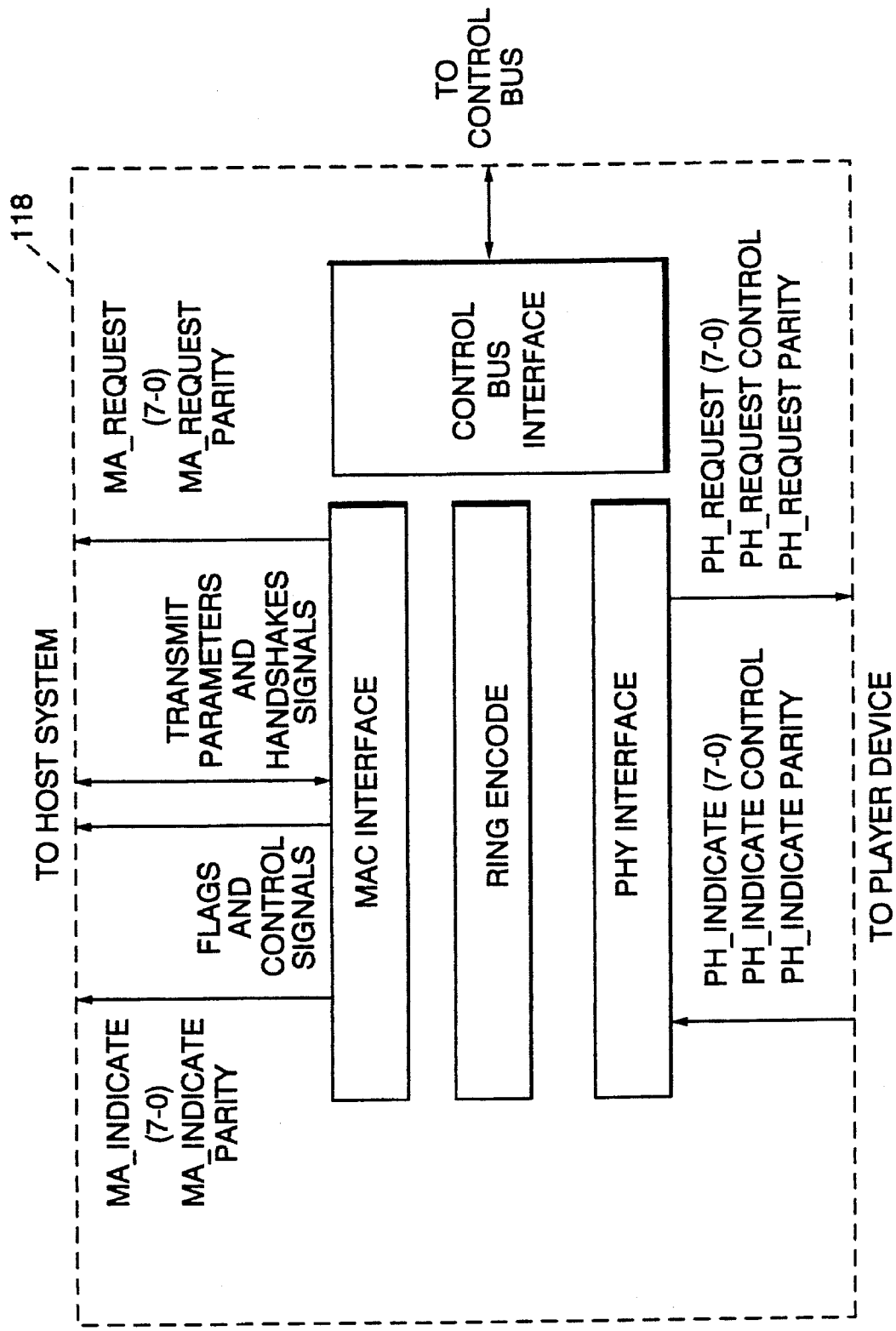

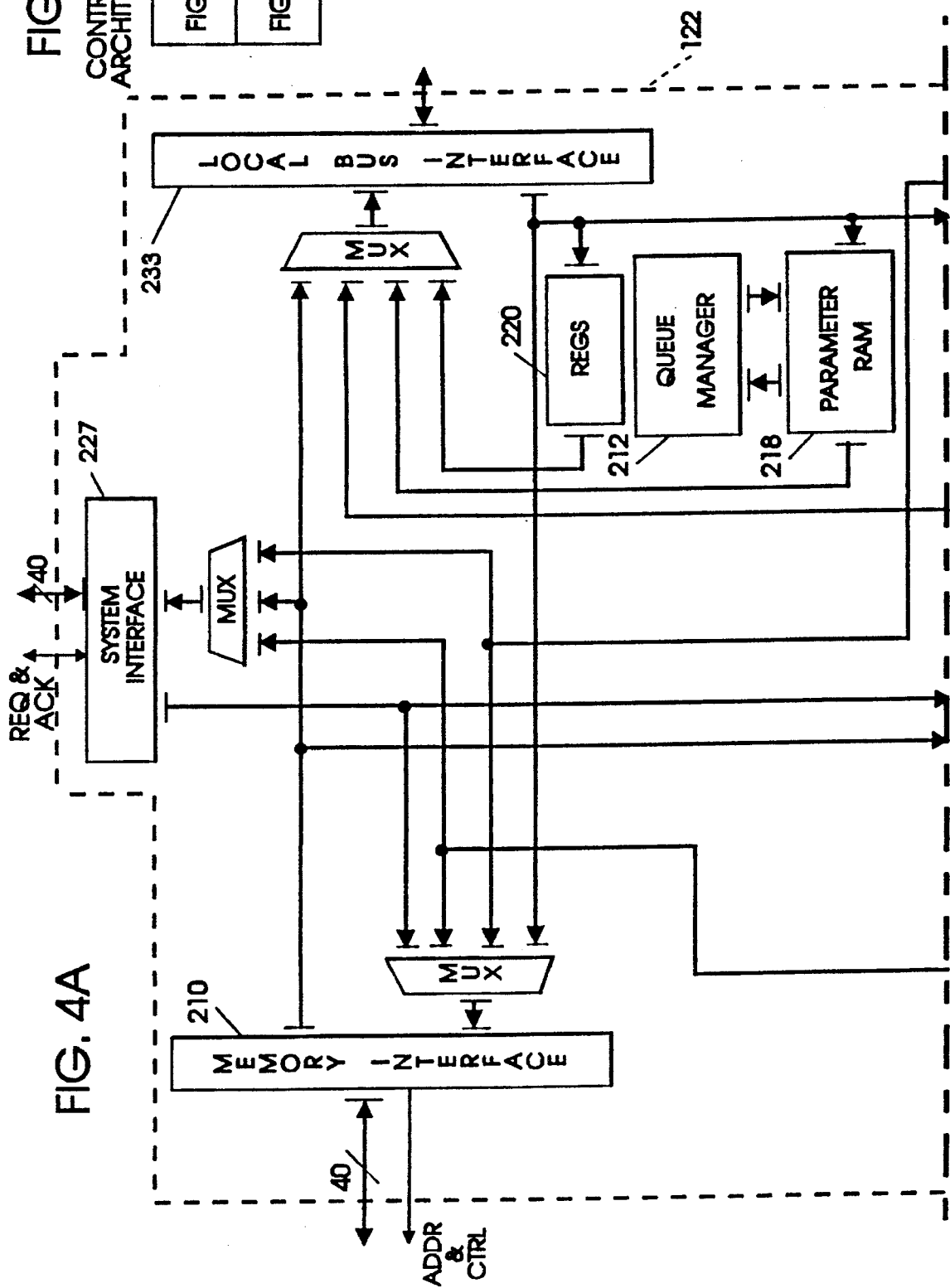

FIG. 5A

TABLE 1. CONTROLLER RECEIVE QUEUES.

| QUEUE NUMBER | QUEUE USAGE | ADDITIONAL PROGRAMMABLE OPTIONS |
|---|---|---|
| 0 | RECEIVES SYNCHRONOUS FRAMES. | NONE. |
| 1 | RECEIVES ASYNCHRONOUS AND MAC FRAMES. | SKIP OPTION USING BIT 4 OF MODE REG: FILTERS DUPLICATES OF DIRECTED BEACONS MAC FRAMES. |
| 2 | RECEIVES SMT FRAMES. | NONE. |
| 3-7 | RECEIVES ISOCHRONOUS RING DATA. | NONE. |

FIG. 5B

TABLE 2. CONTROLLER TRANSMIT QUEUES.

| QUEUE NUMBER | QUEUE USAGE |
|---|---|
| 0 | • TRANSMITS SYNCHRONOUS FRAMES WHEN BIT 8 OF MODE REG IS RESET. |
| 1 | • TRANSMITS ISOCHRONOUS TRAFFIC WHEN BIT 8 OF MODE REG IS SET.<br>• TRANSMITS ASYNCHRONOUS AND MAC FRAMES IN NORMAL MODE AND BIT 7 OF MODE REG IS RESET.<br>• TRANSMITS VOID OR BEACON FRAMES IN VOID OR BEACON MODE. |
| 2-7 | • TRANSMITS ISOCHRONOUS RING DATA. |

MODE REGISTER

FIG. 6A

QUEUE STATUS REGISTER

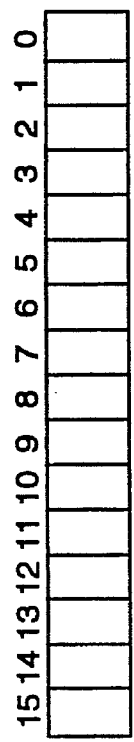
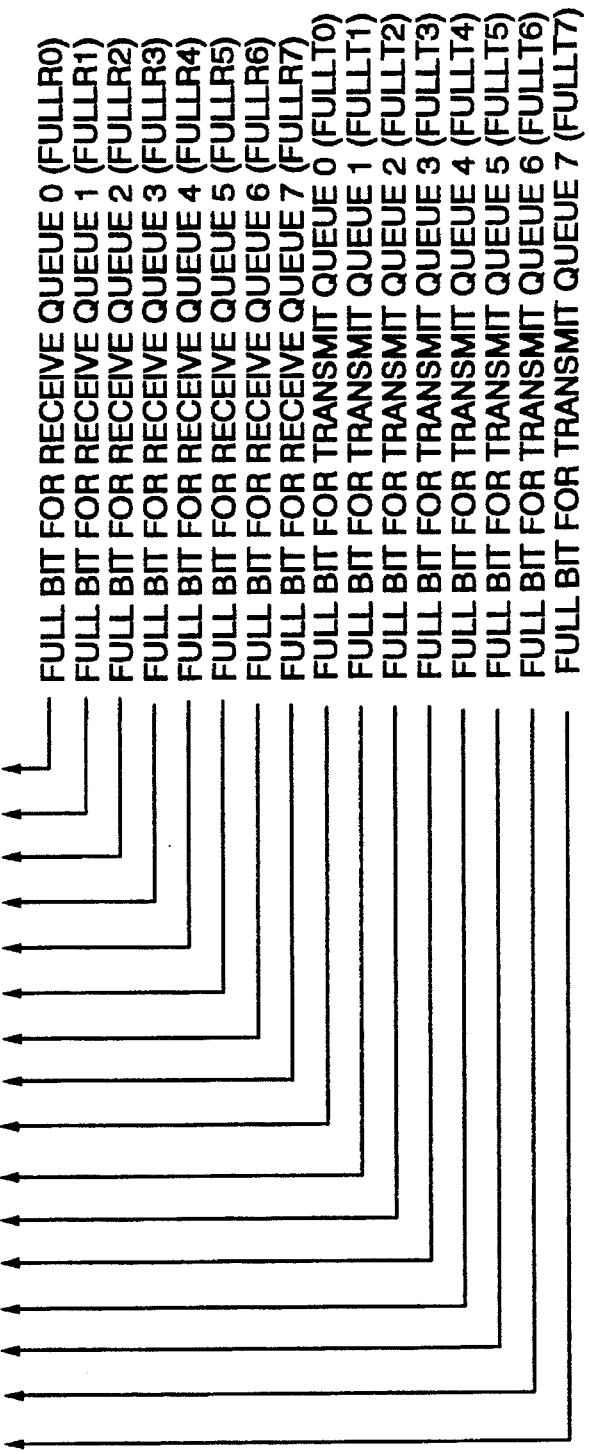

- FULL BIT FOR RECEIVE QUEUE 0 (FULLR0)
- FULL BIT FOR RECEIVE QUEUE 1 (FULLR1)
- FULL BIT FOR RECEIVE QUEUE 2 (FULLR2)
- FULL BIT FOR RECEIVE QUEUE 3 (FULLR3)
- FULL BIT FOR RECEIVE QUEUE 4 (FULLR4)
- FULL BIT FOR RECEIVE QUEUE 5 (FULLR5)
- FULL BIT FOR RECEIVE QUEUE 6 (FULLR6)
- FULL BIT FOR RECEIVE QUEUE 7 (FULLR7)
- FULL BIT FOR TRANSMIT QUEUE 0 (FULLT0)
- FULL BIT FOR TRANSMIT QUEUE 1 (FULLT1)
- FULL BIT FOR TRANSMIT QUEUE 2 (FULLT2)
- FULL BIT FOR TRANSMIT QUEUE 3 (FULLT3)
- FULL BIT FOR TRANSMIT QUEUE 4 (FULLT4)
- FULL BIT FOR TRANSMIT QUEUE 5 (FULLT5)
- FULL BIT FOR TRANSMIT QUEUE 6 (FULLT6)
- FULL BIT FOR TRANSMIT QUEUE 7 (FULLT7)

FIG. 6B

RECEIVE QUEUE ENABLE / DISABLE REGISTER

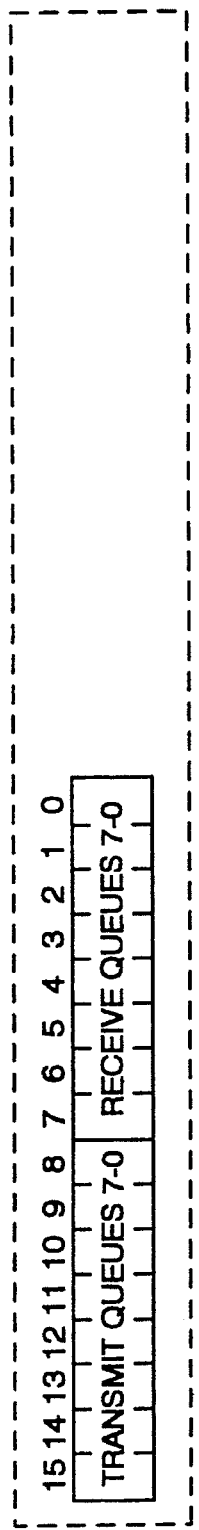

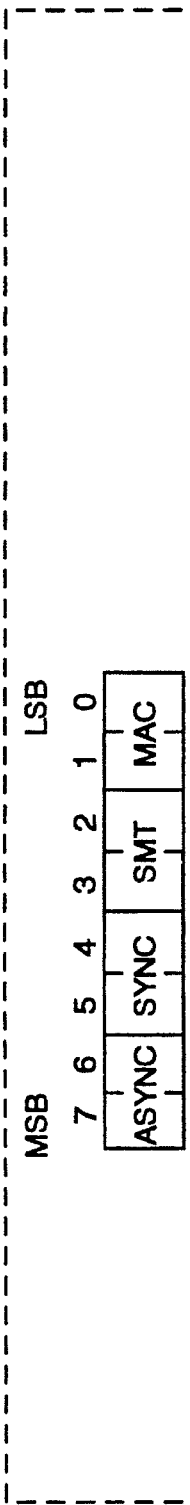
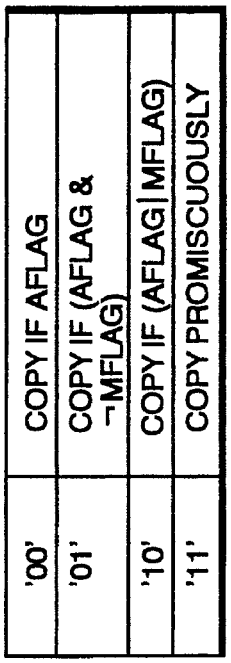
FIG. 7
P_MAC COPY CRITERIA REGISTER
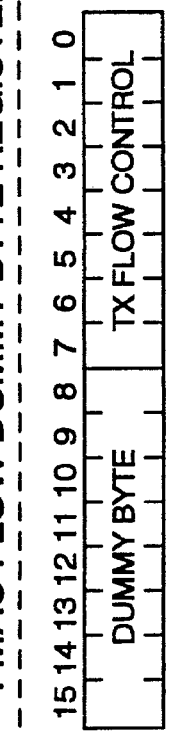
FIG. 8
I-MAC FLOW DUMMY BYTE REGISTER
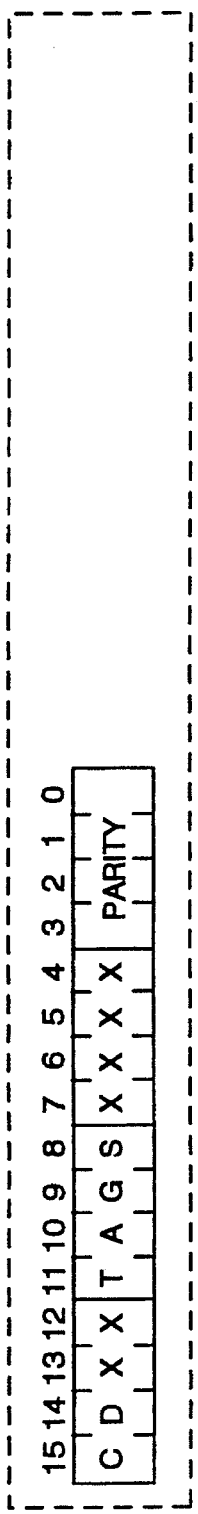
FIG. 8A
FRB/FIFO PARITY/TAG/REGISTER

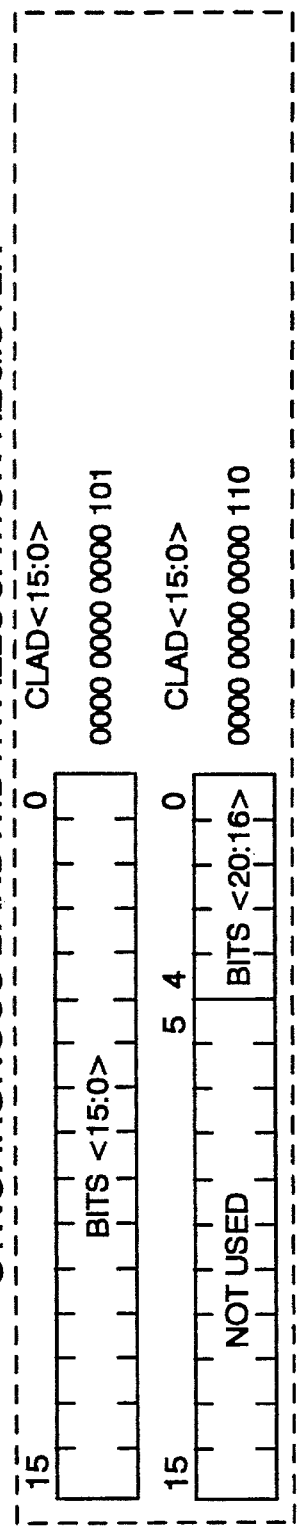
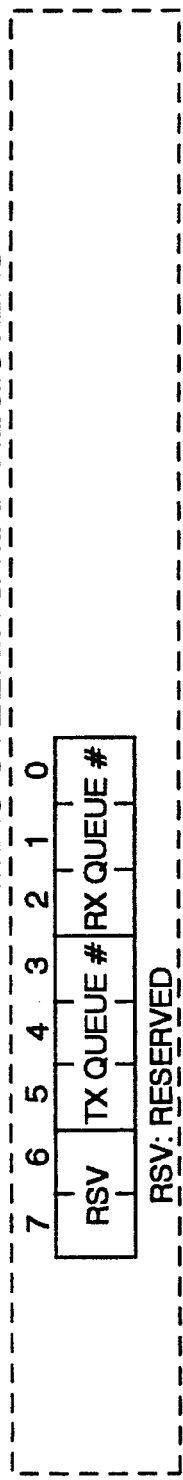
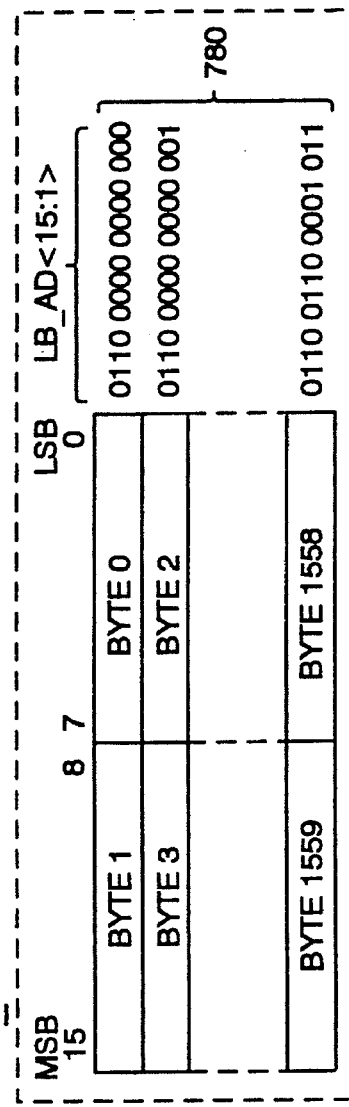

MASTER INTERRUPT REGISTER

COMMUNICATIONS SYSTEM AND METHOD FOR EFFICIENT MANAGEMENT OF BANDWIDTH IN A FDDI STATION

RELATED APPLICATIONS

Copending application entitled "Multimedia Communication Apparatus and Methods" (BT9-93-060), Ser. No. 08/282,376, filed Jul. 29, 1994, is incorporated herein in its entirety by reference. This copending application is related to this application through common inventorship.

Application entitled "An Architecture for High Performance Management of Multiple Circular FIFO Storage Means" (BT9-93-061), Ser. No. 08/412,812, filed Mar. 29, 1995, now U.S. Pat. No. 5,519,701, is incorporated herein in its entirety by reference. This application is related to this application through common inventorship.

BACKGROUND OF THE INVENTION

1. Field of the Invention

This invention relates to communication systems and methods for transferring multimedia and packet data, in either direction, between a host system and a station in a FDDI or token passing network and managing bandwidth at a station in real time. More particularly, the invention relates to communication systems and methods for real time, dynamic management of bandwidth on a station in a FDDI or token passing network transferring data, in either direction, between the network and a host system.

2. Description of the Prior Art

Prior art systems for communicating in either direction multimedia and packet data between a host system and a FDDI and managing bandwidth include the following:

U.S. Pat. No. 4,862,451 describes switching apparatus and a method for transferring information between channels carrying synchronous information traffic and channels carrying asynchronous data packet traffic. The apparatus interrupts asynchronous packet transmission at the end of a preselected time frame and re-arranges finished or established connections in accordance with a flexible arbitration scheme to support synchronous and asynchronous traffic in a single exchange operation.

U.S. Pat. No. 5,043,981 describes a data flow controller which detects various conditions of a particular queue of an output buffer memory receiving framed data of a particular priority when the amount of storage remaining available for the particular queue is not greater than the predetermined storage capacity of the memory. In response to selected conditions, the controller terminates transfer of data from the system memory to the controller memory and initiates transfer of data, having a different priority from the system memory through the controller memory to a particular queue of the output buffer.

U.S. Pat. No. 5,245,605 describes a method and apparatus for controlling the transmission of a first class of traffic which is transmitted on a ring network with a second class of traffic. The '605 Patent provides for the transmission of a first control signal where both classes of traffic may be transmitted on the ring if current protocols permit. The first control signal will be changed to a second control signal if, after the first control signal is transmitted at least once around the network, the first control signal reaches a station having a backlog of second class traffic. The second control signal is transmitted once around the network to indicate to each station that it may not transit the first class traffic. The first class of traffic is usually asynchronous data while the second class of traffic is usually synchronous data.

U.S. Pat. No. 5,392,280 describes a data transmission system and scheduling protocol utilizing both synchronous transmission and asynchronous transmission in an alternating pattern to provide each user with a guaranteed transmission bandwidth or capacity to accommodate real time communication. The synchronous time slots provide for the bandwidth guarantees while the asynchronous time slots are used to transmit data when a part of a previous synchronous slot is not used. The asynchronous time slots also permit asynchronous data transmission using unallocated time within a given time frame.

U.S. Pat. No. 5,208,809 describes a node for use with asynchronous and synchronous communication networks to indicate interconnect data systems with networks having transmission paths interconnecting network nodes. Clock apparatus synchronizes a flow of data on an incoming transmission both within the node at a pulse rate of the generated clock pulses independent of a data transfer rate on the data flow on both the incoming and outgoing transmission paths.

U.S. Pat. No. 4,665,518 describes a data bus system including a plurality of serially connected active terminals configured to receive data and either, retransmit the received data or transmit new data to the next adjacent terminals. The system is devised where a plurality of user data sinks may receive synchronous data occurring at predetermined times and asynchronous data occurring at random times.

U.S. Pat. No. 5,206,857 describes a technique for distributing timing synchronization among selected nodes of a ring network. Clock synchronization is optionally and independently available to a node in the system which simultaneously supports both synchronous and asynchronous data transfer. Each node includes a clock for supplying timing information to equipment at the node. A master node measures time delay encountered by data in the network and transmits the measurement to a slave node. The difference between the master and slave measurement adjusts the clock at the slave node.

U.S. Pat. No. 4,763,321 describes a system for dynamically allocating circuit slots in frames which are used for exchanging bits between users connected to nodes of a communication network linked by means of medium links having transmit and receive interfaces. The frames are delimited by flags and divided into bit slots which may be used for synchronous circuit flow or asynchronous packet flow. The system insures a dynamic allocation of bandwidths to circuit or packet switched bit users according to user activity.

None of the prior art discloses apparatus and method in a communication network for switching between synchronous and asynchronous data and dynamically guaranteeing bandwidth for the traffic in either direction between a host bus system and a FDDI system. The method and apparatus further provide for (1) giving multimedia traffic preference over packet traffic; (2) managing the data flow within the bandwidth of the network; and (3) early capture of a token before multimedia or packet data has been buffered for transmission.

SUMMARY OF THE INVENTION

An object of the invention is an adapter in a communication system which automatically and dynamically manages bandwidth on a station in a FDDI network without intervention of the system.

Another object is an adapter in a communication system which can dynamically switch between multimedia and packet data while ensuring multimedia and packet bandwidth are not exceeded.

Another object is an adapter which can initiate token capture on a FDDI network before an entire frame, either multimedia or packet data, has been buffered.

Another object is an adapter which may be programmed and reconfigured at any time to manage the bandwidth on a station in a FDDI network without outside interference.

Another object is an adapter which dynamically manages traffic transferred in either direction between a host bus system and a FDDI network whereby multimedia traffic is given higher priority over packet traffic.

Another object is a method for efficient and dynamic management of bandwidth for synchronous and asynchronous data on a station in a FDDI network.

Another object is a method of capturing a token before an entire frame of multimedia or synchronous data has been buffered.

Another object is a method of capturing the token on a FDDI network and commence transmitting multimedia or packet data frames as early as possible.

These and other objects and features of the invention are accomplished by an adapter in a communications system for transferring multimedia and packet data in real time between a FDDI network and a host bus system. For purposes of the present invention, multimedia data refers to synchronous (packet) traffic and packet data refers to asynchronous (packet) traffic, as defined in the FDDI standard. The adapter includes a queue manager comprising a multimedia threshold register and counter, and a packet data threshold register and counter. The queue manager is coupled to a first interface coupled to the host bus. A storage means for storing multimedia and packet data in separate queues is coupled to the queue manager as a second interface. A third interface couples the FDDI network to the queue manager. Bandwidth control logic is coupled to the queue manager, the third interface and a local processor whereby a token capture on the FDDI can be initiated before multimedia or synchronous data has been buffered in the storage with the queue manager managing data transfer in both directions between the host bus system and the network on a real time basis. The queue manager automatically switches between transferring multimedia and packet data without intervention from the system.

As words are received from the host, an asynchronous or synchronous threshold counter is increased depending upon whether the word was part of a synchronous or asynchronous frame. The frames are interleaved. When reaching a program threshold or receiving one complete frame, a token capture is implemented. When a token is captured, all synchronous traffic is transmitted first over asynchronous frames due to a higher priority. Once all synchronous traffic has been transmitted, all asynchronous traffic is transmitted, asynchronous frames are transmitted provided a token holder timer is less than or equal to a target FDDI station time. In order to prevent a station from utilizing more than its allocated bandwidth, a synchronous register value is set. If the station uses more than its allotted bandwidth while in the middle of transmission, the frame is completed, the counter is disabled; upon release of the token, the counter is reloaded with a value in a holding register. The counter is enabled at the beginning of the next FDDI service opportunity.

BRIEF DESCRIPTIONS OF THE DRAWINGS

FIG. 3 is a block diagram of a Media Access Control (MAC) included in FIG. 1.

Figure 4B:
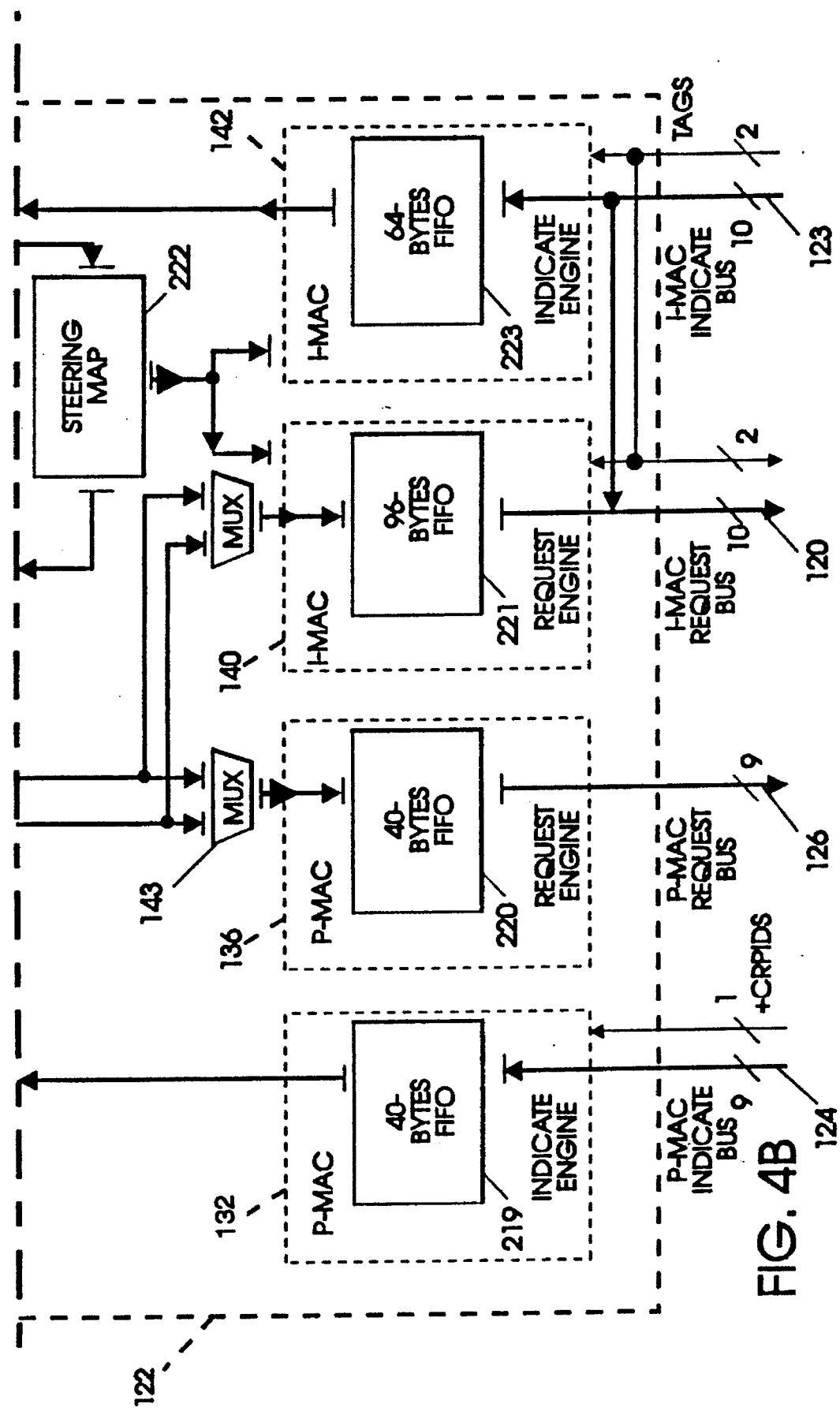
FIG. 4 is a composite diagram of a controller included in FIG. 1.

FIGS. 4(a) and 4(b) are block diagrams of the controller of FIG. 4.

Figure 1:
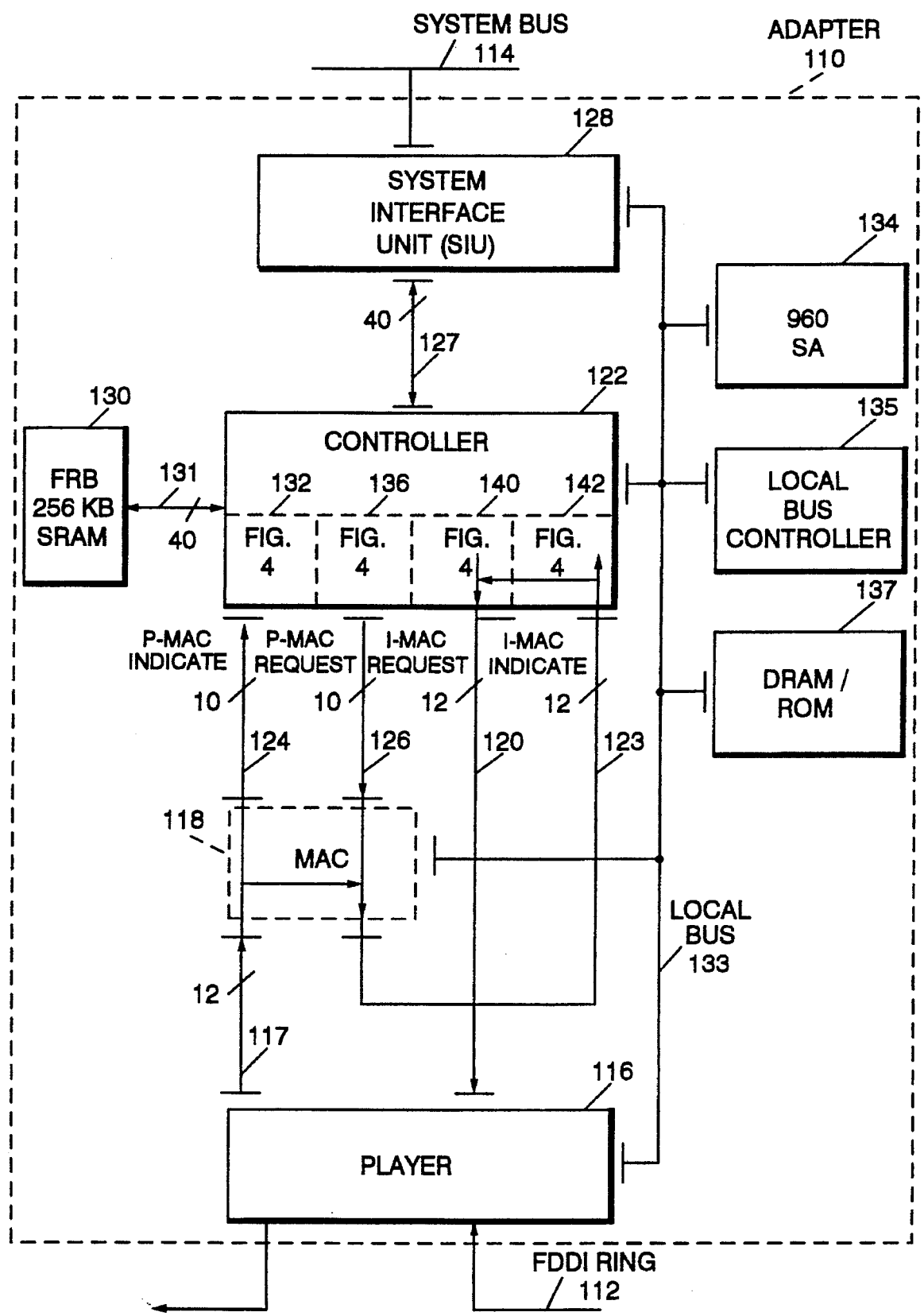
FIG. 1 is a block diagram of a multimedia communications adapter incorporating the principles of the present invention.
Figure 5:
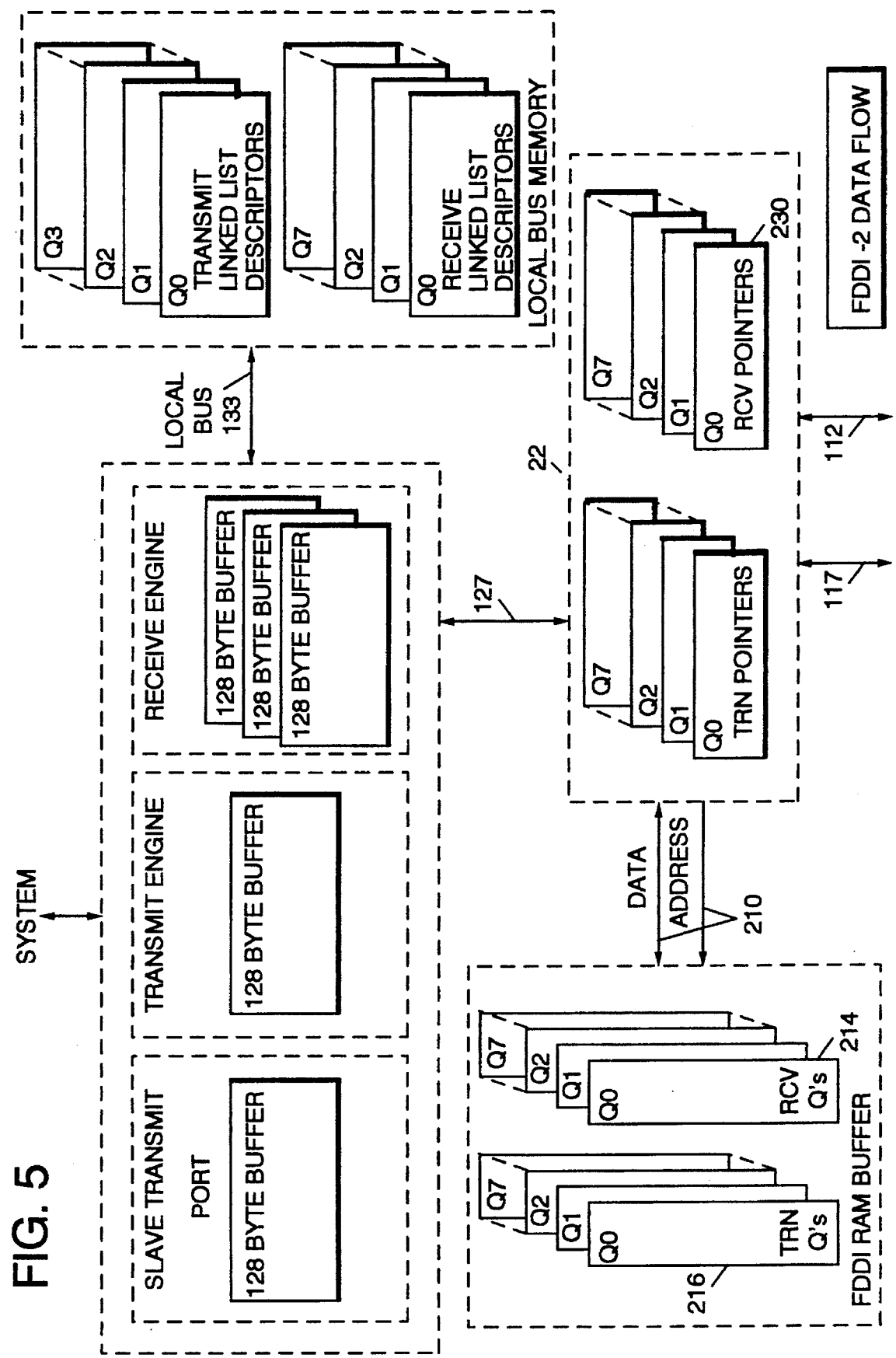

FIG. 5 is a block diagram showing the data flow, pointers and descripters employed in the adapter shown in FIG. 1.

FIG. 5(A) is a table describing the usage of received queues shown in FIG. 5.

FIG. 5(B) is a table describing the usage of transmit queues shown in FIG. 5.

Figure 6:
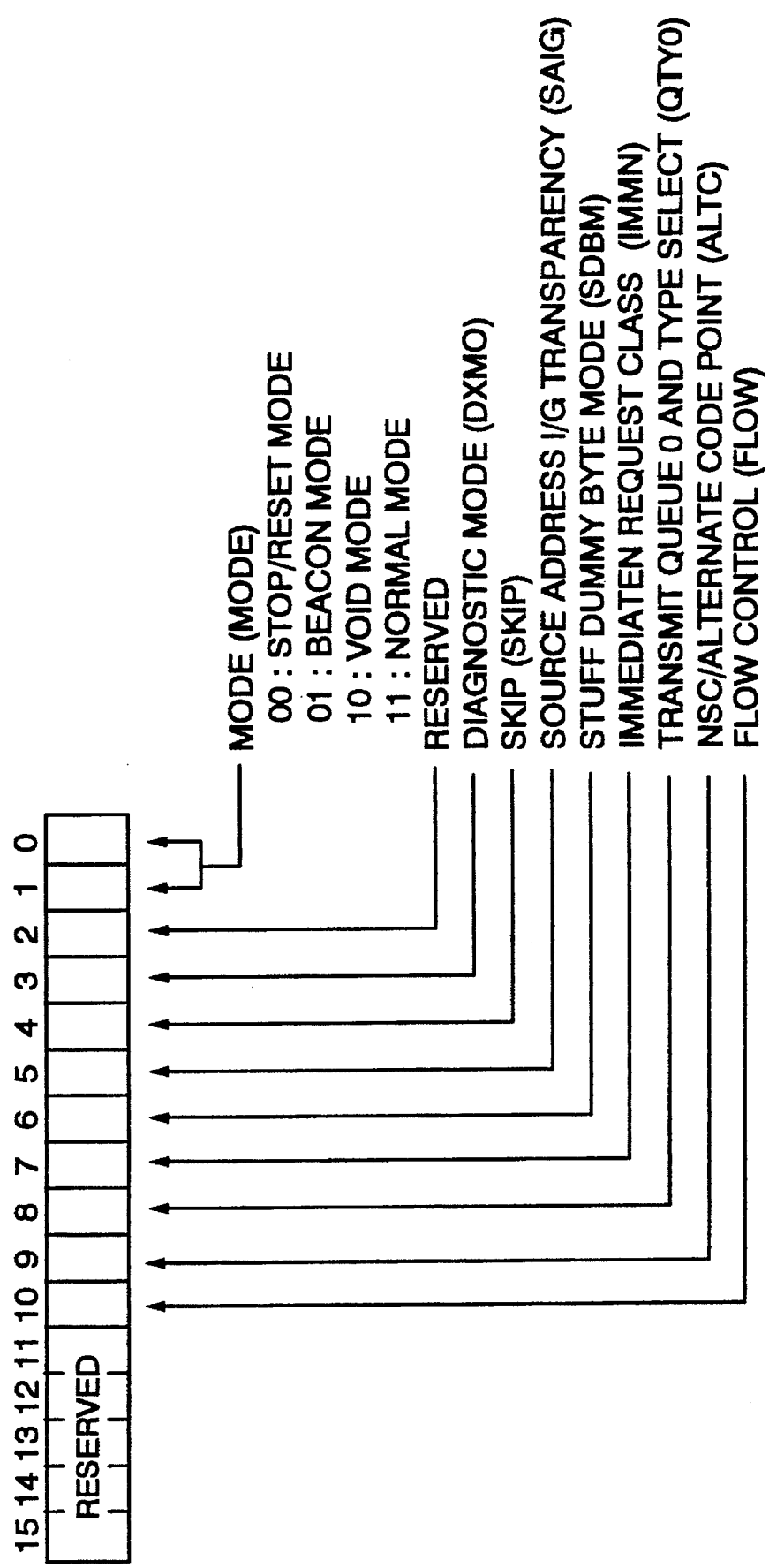

FIG. 6 is a representation of a mode register included in the controller of FIG. 4.

FIG. 6(A) is a representation of a queue status register included in the controller of FIG. 4.

FIG. 6(B) is a representation of the queue enable/disable register included in the controller of FIG. 4.

FIG. 7 is a representation of a P-MAC copy criteria register included in the controller of FIG. 4.

FIG. 8 is a representation of a I-MAC flow/dummy byte register included in the controller of FIG. 4.

FIG. 8(A) is a representation of a FDDI RAM Buffer/ FIFO parity/tag register included in the controller of FIG. 4.

FIG. 9 is a representation of a synchronous bandwidth allocation register included in the controller of FIG. 4.

Figure 10:
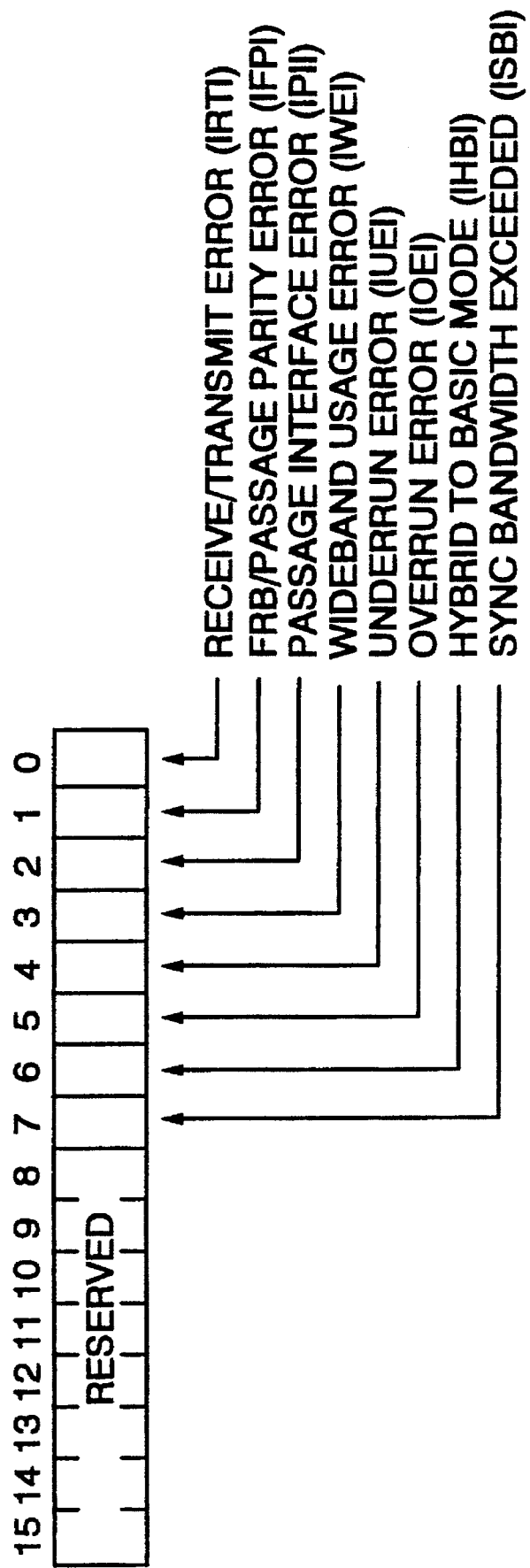

FIG. 10 is a representation of master interrupt register included in the controller of FIG. 4.

FIGS. 11 and 11(A) are representations of an IMAC Steering Register and addressing representations, respectively, included in the controller of FIG. 4.

Figure 12:
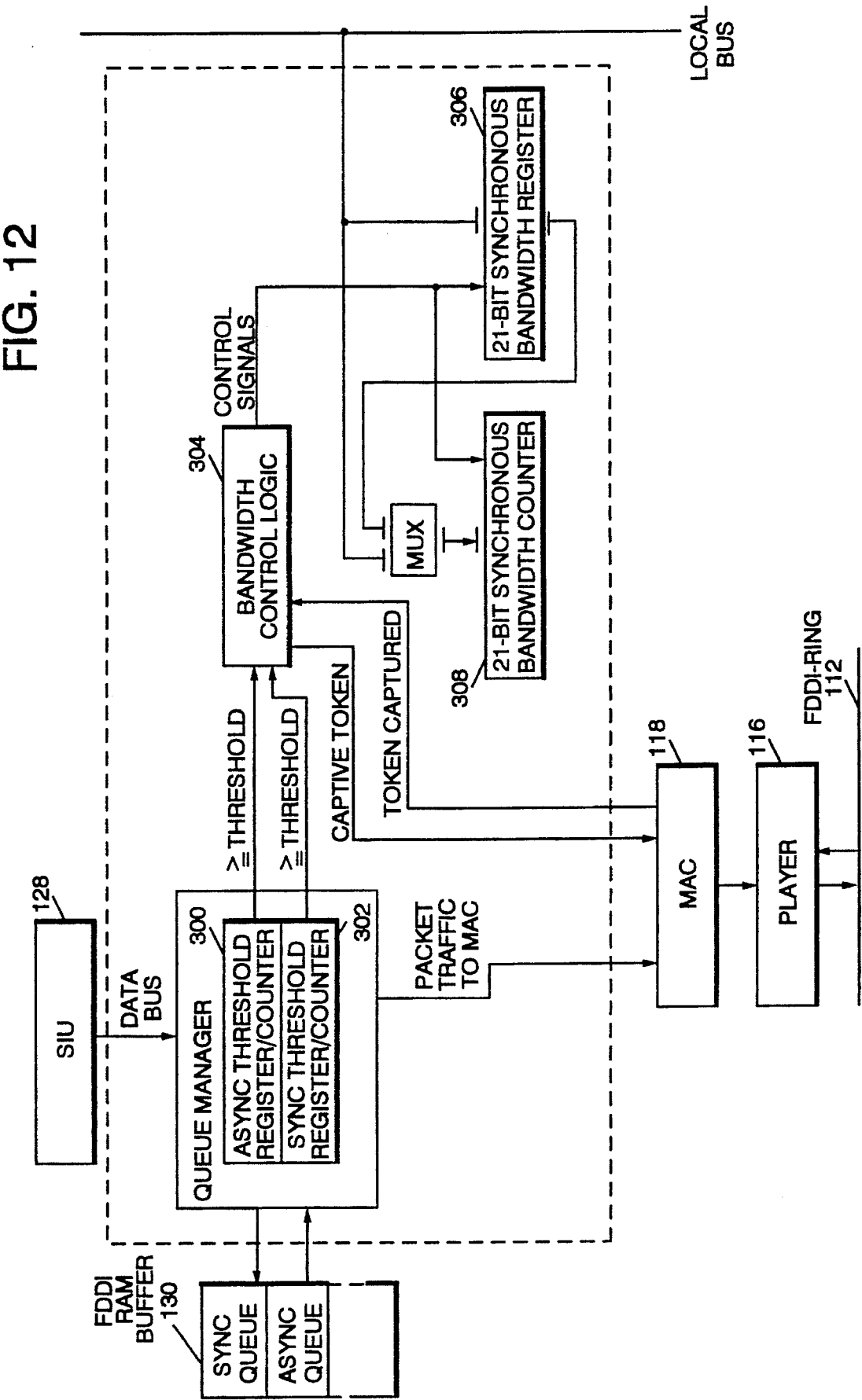

FIG. 12 is a block diagram of a bandwidth control logic unit in the controller of FIG. 4 and incorporating the principles of the present invention.

Figure 13:
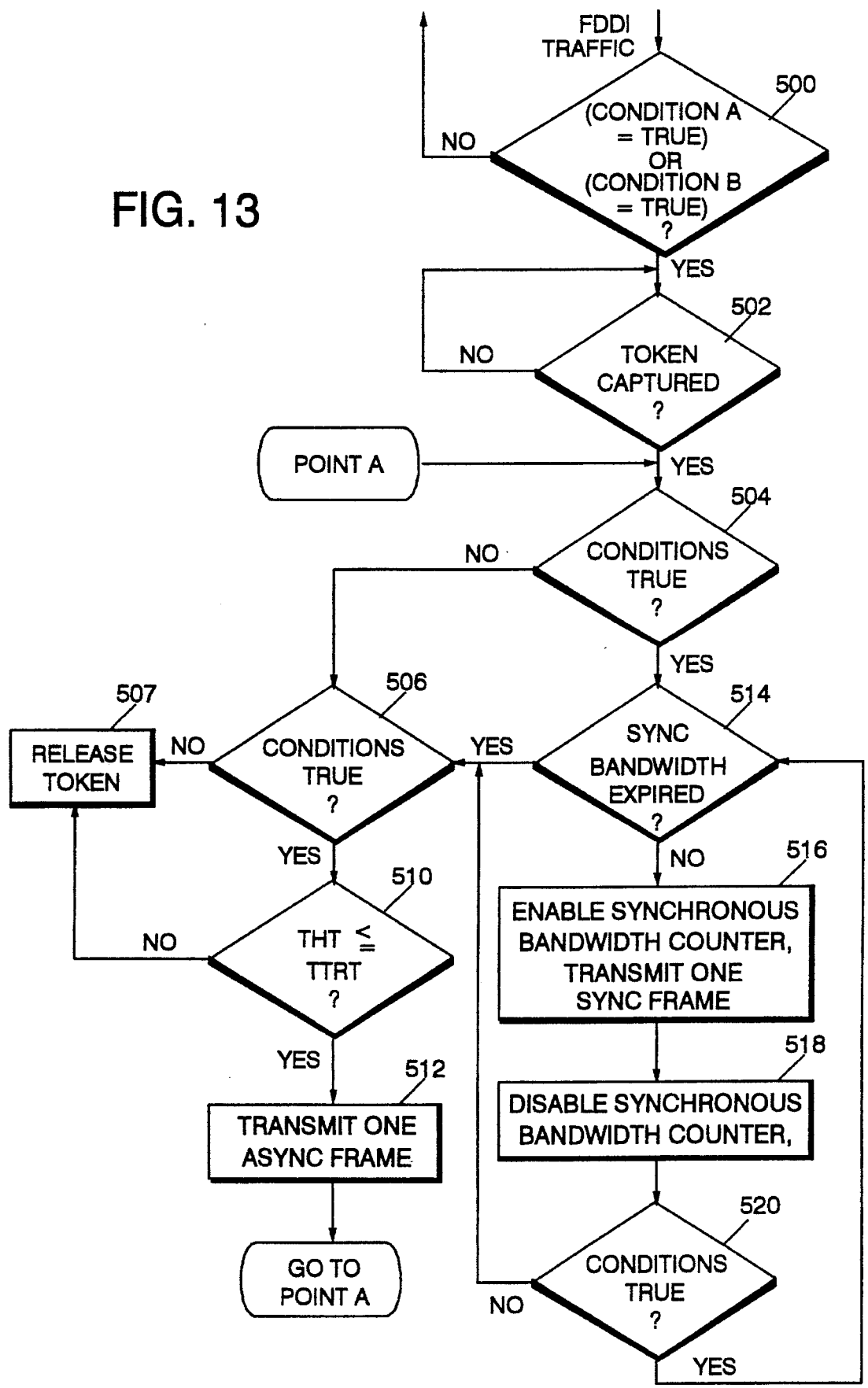

FIG. 13 is a flow diagram of a bandwidth algorithm for managing FDDI traffic on a station in a network and using the unit of FIG. 12.

DESCRIPTION OF THE PREFERRED EMBODIMENT

FIG. 1 shows an adapter 110 in a communication system for receiving and transmitting packet and/or isochronous data between a FDDI ring 112 and a Host Bus system 114, which in one form may be a Micro Channel. The adapter includes a physical interface layer 116 that implements the physical layer defined by ANSI X3T9.5 Standard and also provides the functions required for hybrid mode operation. The interface 116 converts the serial bit stream from the FDDI ring into an 80 nanosecond (n.s.) byte stream for a Media Access Register (MAC) 118 with all bytes tagged as packet or isochronous. The interface 116 also connects to a request bus 120 for receiving an 80 n.s. byte stream from a controller 122.

The Media Access Control (MAC) 118 implements the function defined in ANSI X3T9.5 Standard. Each byte received from the MAC 118 is received by the controller 122 on a packet memory access control indicate bus 124. Along with the data bytes, the MAC 118 provides a set of sequencing signals and flags that are asserted on the occurrence of events, e.g., frame controlled on the indicate bus 124, match on the destination address received, etc. The MAC 118 also controls the transmission of packet data, but before transmission can occur the token must be captured on ring 112. The controller 122 first requests the capture of the token by asserting a non-zero value on a request bus 126 which connects to bus 120. When the MAC signals the controller 122 that the token has been captured, the controller 122 begins transmitting the packet frame on the bus 126. The MAC either repeats the data it receives on the bus 117 or transits the data output on the bus 126.

The controller 122 controls data flow between the FDDI ring 112 and a System Interface Unit (SIU) 128, and may temporarily buffer data in a FDDI Ram Buffer 130 (FRB), if necessary. A local bus interface 133 is connected to a local processor 134 which provides interrupts at access registers of the controller 122 or the FRB 130. The path to the FRB 130 is provided for two reasons. First, the processor 134 can write and read FRB 136 to verify its functionality as part of bringing up diagnostic routines. Secondly, the processor 134 can store network protocol frames in the FRB 130, and when it desires, requests the controller 122 to transmit those frames to the ring 112. The controller 122 is designed to interface with the ring 112 operating at either basic or hybrid mode. Basic mode refers to an operation mode where only FDDI traffic, i.e. asynchronous and/or synchronous traffic is transmitted/received. Hybrid mode refers to an operation mode to support all FDDI-2 traffic, i.e. asynchronous, synchronous, and isochronous. Included in the controller 122 are packet and media access control (PMAC) request and indicate engines 132 and 136, respectively, and isochronous memory access (IMAC) request and indicate engines 140 and 142, respectively. The IMAC is a FDDI-2 extension to the FDDI standard and allows transmission of isochronous traffic on a packet network by time division multiplexing the isochronous data with the packet (asynchronous and synchronous) traffic. The engine 132 handles the processing of all packet data received from the MAC 118. The indicate engine 142 processes all isochronous data received from the MAC 118. Data transmitted to the interface 116 is handled out of the request engines 136 and 140. In basic mode, all data input from an indicate bus 123 is repeated on to request bus 120. The controller provides a minimum amount of buffering as isochronous/packet data is transferred to/from the modules 116/118 and the interface 128. The controller 122 has the capability to transfer data directly to/from the system interface 128 and the PMAC and IMAC engines by passing the FRB 130. For the most part, packets and isochronous data are placed into queues 214, 216 (see FIG. 5) in the FRB 130, operating as circular FIFO's (First In/First Out) registers. FRB 130 is implemented with fast static rams providing the fast access required to meet the controller's bandwidth requirements. The controller manages read and write pointers to sixteen queues (8 RCN or receive, 8 TRN or transmit) in the FRB 130. Threshold registers are provided for each queue within the controller, and are programmed by the local processor 134. As thresholds are crossed for a particular queue, the controller sets the associated bit (for that queue) in a status register (not shown) of the controller/system interface 127 which is periodically polled by the SIU 128. Once SIU 128 has determined which queue in the FRB 130 it desires access to, it places the queue number on a controller/system interface 127. Data is transferred into the queue and the FRB 130 is either filled or becomes empty. A local bus controller 135 gains access to the registers of the controller 122 by providing address/data and controls (select, address latch, data enable, etc.) to the local bus interface 133. The local bus interface 133 decodes the address and routes the incoming data to the correct registers and the controller 122 for a write operation. The interface 133 also routes the data from the desired register to the local bus on a read operation. Associated with the processor 134 is a dynamic RAM and ROM 137. The dynamic RAM is used as a program and data store. The ROM is provided for diagnostics, initialization, and vital product data.

Figure 2:
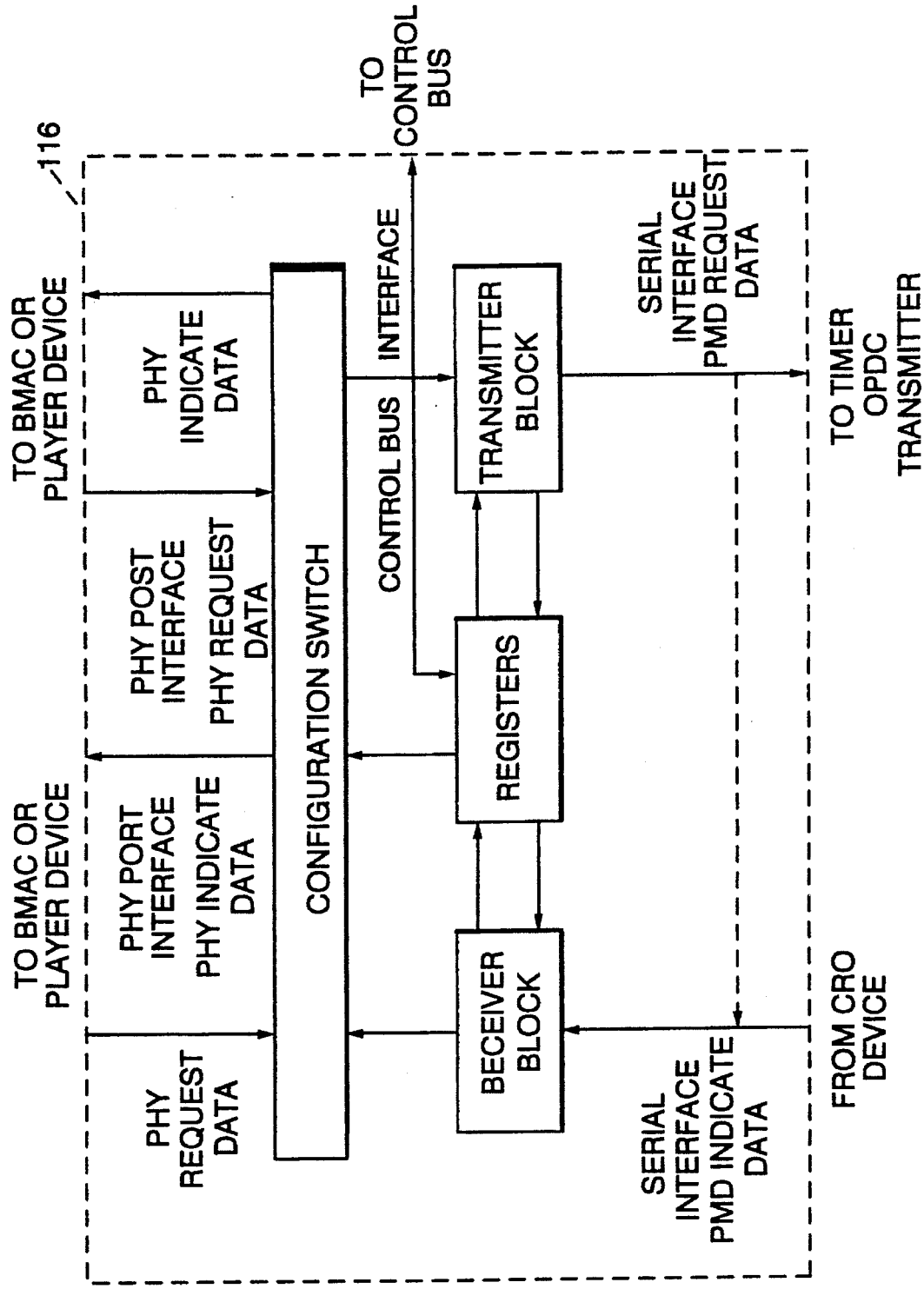
FIG. 2 is a block diagram of a physical interface layer as shown in FIG. 1.

The interface layer 116 (see FIG. 1) performs clock recovery and the 4b/5b encoding/decoding of the 125 mhz. serial ring data. An example of an interface layer is shown in FIG. 2 which is taken from the National Semiconductor FDDI Data Handbook, 1991 Edition, page 2–39.

The MAC 118 provides for the FDDI-1 media access control function including the time token protocol, station address matching, etc. All bytes that are tagged as packet bytes by the interface layer 116 (see FIG. 1) are processed by the MAC. Additionally, all packet bytes to be transferred are inserted into the allocated master cycle packet slots by the MAC. The MAC supplies source addressing stuffing in hardware. An example of a MAC is shown in FIG. 3 which is taken from the National Semiconductor FDDI Data Handbook, 1991 Edition, page 2–133.

Referring to FIGS. 4(A) and 4(B), the controller 122 consists of eight major components which are: An FRB interface 210, the local bus interface 233, a controller/system interface 227, PMAC/IMAC indicate engines 132 and 142, respectively, request engines 136, and 140, respectively, and a queue manager 212. The controller 122 provides the FRB 130, with data to/from either the SIU 128 or the interface 116 and MAC 118 (see FIG. 1). The controller manages the receive and transmit data by placing the data into 8-receive 214 and 8-transmit 216 queues (see FIG. 5) operating as circular FIFO registers. For each queue, there exists a set of registers that must be programmed by the local processor 134 (see FIG. 1) before operation commences. These registers are a base pointer, queue size, threshold value, and read and write pointers, all located in a parameter RAM 218.

The controller includes a set of registers 220, one of which is a mode register (see FIG. 6) which may be set to stop/reset mode. In the stop mode, the P-MAC indicate and request buses 124 and 126, respectively; the I-MAC indicate and request buses 120 and 123, respectively; and the interface 127 are disabled and frozen in their idle state. The local processor 134 (see FIG. 1) still has the ability to read/write the FRB 130 for diagnostic purposes and can configure the controller's register for operation. Once programmed, the local processor 134 sets the mode bits to normal mode. In normal mode, operation commences, and any frame control bytes recognized at the P-MAC interface 124 are immediately copied into P-MAC receive FIFO 220. Likewise, isochronous bytes are received and transmitted based on valid steering map entries in an I-MAC receive register 222. At the interface 227, the controller 122 responds to any request (read or write to any queue).

The P-MAC interfaces 132, 136 have a separate indicate (receive) 124 and request (transmit) 126 bus with an 80 n.s. byte stream transferred in each direction. Along with the byte stream, the MAC 118 (see FIG. 1) provides a set of sequencing flags and control signals to the P-MAC. As shown in FIG. 1, the I-MAC section is connected in a series with the P-MAC which operates independent of the FDDI ring mode. A strobe signal is provided along with a byte stream identifying whether the incoming byte is intended for the P-MAC. When the strobe is disasserted, the P-MAC ignores all incoming bytes. On those bytes intended for the P-MAC, the P-MAC looks at the flags qualified by the sequencing signals to make a decision to copy or not copy a frame. The copy criteria can be different for frames with different fields. On the output side, the request interface outputs a byte stream to the ring 112 (see FIG. 1) on a service opportunity (i.e., the token has been captured). The MAC 118 outputs on its physical request bus 124 a byte stream that is either the repeated physical indicate bus along with tag bits (identifying the bytes as packets/isochronous) or the MAC request byte stream from the controller which is inputted to the I-MAC 140, 142. All incoming bytes not tagged as isochronous are wrapped to the output of the I-MAC and transmitted to the interface device 116 via its physical request bus 120. Thus, the I-MAC interface also has an 80 n.s. byte stream transferred in each direction.

The I-MAC accesses a steering map and table 222 in synchronism with a hybrid ring cycle when operating in hybrid mode. For each byte in a hybrid ring cycle, the entry in the I-MAC steering table identifies a queue for an incoming isochronous byte to be placed and the queue from which the isochronous byte is to be read from for transmission into the physical request bus to interface 116. The controller gets into synchronism with the FDDI ring by detecting the starter delimiter field at the beginning of a cycle header.

The P-MAC indicate engine 138 consists of an 8-word circular FIFO 219 and decision logic in the form of a wired standard gate array that determines, among other things, whether to copy or not copy frames. The P-MAC copy criteria register (FIG. 7) is used by software to program the criteria for which different frame types are copied into FRB 130. Those packets that the P-MAC indicate engine 132 has determined should be copied are then written to FRB 130 under control of the queue manager 212. A packet frame is then placed into either queue zero, 1, or 2 (see FIG. 5) on whether the code of the frame control field indicated synchronous, asynchronous/MAC, or Station Management (SMT), respectively. Four frame types are recognized and copied into separate queues: Synchronous (Queue zero), Asynchronous/MAC (Queue 1), and SMT frames (Queue 2). Eventually, the external queue in the FRB reaches threshold (this is maintained by the Queue Manager as bytes are written to FRB) or the end of the frame is reached. In either case, a bit in a queue status register (see FIG. 6(A)) that corresponds to the queue is set. The interface 127 periodically polls this register and in subsequent cycles reads that queue.

The P-MAC request engine 136 also consists of an 8-word buffer and a wired standard gate array that is used to transmit in one of the frame types: asynchronous and synchronous. Asynchronous and synchronous frames initially transmitted from the system interface 128 are directly located into a P-MAC transmit FIFO 220 under control of the queue manager 212. Subsequent bytes are placed in the FRB 130 and eventually the end of frame (EOF) or threshold is reached for that queue. At that point, the queue manager instructs the P-MAC request bus 124 to capture the token. Queues 0 and 1 are used to transmit synchronous (queue 0) and asynchronous/SMT (queue 1) frames. In addition, the P-MAC transmit FIFO inputs a synchronous bandwidth allocation counter (see FIG. 9) used to control the amount of synchronous bandwidth on a service opportunity. The P-MAC transmit engine 136 transmits all the synchronous frames buffered within the time limit defined by the synchronous bandwidth allocation counter. While the synchronous frames are being transmitted, any asynchronous frames that the system interface unit (SIU) 128 receives are frontloaded into the P-MAC FIFO 220, with subsequent bytes written to FRB 130.

The controller begins to transmit asynchronous traffic once all of the synchronous traffic is sent or the synchronous bandwidth allocation counter has expired, and a token holder timer (not shown) maintained in the MAC 118 has not expired. Any frames, synchronous or asynchronous, once the controller has initiated transmission, always complete, regardless of subsequent counter or timer expiration.

The I-MAC indicate engine 142 is a wired standard gate array that, among other things, copies the incoming isochronous bytes destined for the station. As previously mentioned, the I-MAC must first get in sync with the FDDI master cycle. This is done by comparing all incoming bytes tagged as control bytes with the starter delimiter of the cycle header. Once detected, the 1560 byte steering map 222 is read in advance of each byte in the wideband channels to be received/transmitted to the ring. The steering map is a one-for-one entry of each byte slot in a FDDI II cycle. Each entry contains the queue from/to which the bytes are to be received/transmitted to the ring for that time. Invalid entries indicate nothing is to be received or transmitted. The wideband channels can be configured in a variety of ways. For example, within an isochronous wideband channel, the bytes can be received/transmitted from different queues. The I-MAC indicate engine 142 accounts for this by providing two levels of buffering. At the first level, a 4-byte word is constructed from each byte received for each queue. The second level of buffering is a pool of built words staged from the first level along with the queue numbers for that word. The words are loaded into an 8-word deep FIFO 223 from which the queue manager transfers the word to either the interface 227 (if buffering is available for that queue) or to the FRB 130.

The I-MAC request engine 140 is a wired standard gate array that, among other things, handles the transmission of isochronous data to the ring. The I-MAC request engine indicates to the queue manager 212 the queue whose buffer is not full. The queue manager sets the queue status register bits to indicate the queues used for isochronous traffic, and which are ready for transmission. The initial words are directly located into the I-MAC request engine 140 and only when the buffer for that queue in the I-MAC request is full or the queue manager has placed data for that queue into the FRB are subsequent words written to FRB. The queue manager attempts to keep all the buffers for each active transmit queue full. In a similar fashion to that for the engine 142, two levels of buffering are provided for the request engine 140. At the first level, are the words of each queue, and as the steering map is read, the appropriate byte is transmitted to the ring, provided a valid entry is in the steering map for that queue. The request engine 140 maintains which byte is to be transmitted to the ring, once all the bytes of the word for a particular queue have been transmitted, then a new word is staged from the second level of buffering. In the second level of buffering, two words of buffering are provided for each queue. The request engine 140 keeps the queue manager informed as to which queues need words. The queue manager attempts to keep all the buffers full for all active queues.

The queue manager 212 is a wired standard gate array, and among other things, services requests from all the other sections within the controller such as: The P-MAC request 136 and indicate engines 132, the I-MAC indicate 142, request 140 engines; the controller interface 227, and the local bus interface 233. A request signifies one of the sections asking the queue manager to either receive or transmit a word to/from another section via one of the internal buses, that is, the queue manager controls usage of the internal buses (drives the multiplexor controls) and with each service maintains the status of an affected queue. The queue manager also maintains a parameter RAM 218 where the thresholds, read and write pointers for all queues reside. Simultaneous requests are prioritized and processed sequentially, the queue manager having the intelligence to service two requests in the same cycle provided those requests do not contend for the same bus. Further, the queue manager is adapted to front-load the system interface unit 128, the P-MAC sections 136 and 132, or the I-MAC sections 140, 142, when buffer space is available instead of writing the words to the FRB 130. As an example, the P-MAC indicate engine 138 requests a receive packet word to be taken from the P-MAC's FIFO 219 (which will frequently happen as packet frames destined for this station are received). If that is the only request, the queue manager reads the word out of the P-MAC FIFO and either directly loads the controller/system interface 227 into the associated queue (provided there is buffer space available) or commands the FRB to write the word to FRB. If the word must be written to FRB, the parameter RAM 218 is read to obtain the location where the word is to be written. Once the operation completes, the write pointer is updated and written back to the parameter RAM.

The controller/system interface 227 is a synchronous interface running at 50 mhz. The system interface 128, is the master device requesting status on the FRB queues. Once a particular queue has reached threshold, the corresponding bit in a status register is set and the system interface 128 determines which queue it wishes to transmit or receive data from by placing the queue number on the interface. The transmission of each word across the interface 227 is done using a request/acknowledge scheme.

The local bus interface 133 is provided for the local processor 134, a commercially available micro processor, to configure the controller's internal registers. Also, the local processor can access the FDDI RAM buffer, if so desired, as part of the diagnostic routines during bring up. The local processor can also place network protocol frames in the FRB when it desires the controller to continuously transmit these frames.

The register 220 contains five (5) register sets used in the controller: Control registers; Event registers; Queue and Parameter RAM Registers; and IMAC Map Steering registers. The control registers comprise a mode register; queue enable/disable register; PMAC copy criteria register; I-MAC flow control register; parity control register and synchronous bandwidth allocation register.

In FIG. 6, the mode register is shown. Two bits are set in the mode register for operating the controller 122. Four modes are available: Stop/Reset; Beacon; Void; and Normal. In the stop/reset mode I-MAC, P-MAC and the controller interface 127 are in a stop mode and no data can be transferred. The Beacon mode causes the controller to transmit directed beacon frames located in the FRB without capturing a token. The Void mode causes the controller to transmit the void frame located in the FRB after the token has been captured. Normal mode enables the P-MAC, I-MAC and System Interface Unit to begin processing isochronous and packet MAC frames.

In FIG. 6(A), the Queue Status register is shown. The register allows software to know whether each receive and transmit queue is empty or full. The register will be discussed in more detail in connection with the description of the parameter RAM, hereinafter.

In FIG. 6(B), queue enable/disable register as shown allows software to enable/disable any of the 8 receive or 8 transmit queues individually. Each bit when set enables a particular queue for usage, bit 0 to 7 control the enabling or receiving queues 0 to 7 respectively. Likewise, bits 8 to 15 are used to enable/disable transmit queues 0–7.

In FIG. 7, a P-MAC copy criteria register is shown and used to program the copy criteria of MAC, SMT, SYNC, and ASYNC frames at the P-MAC indicate bus individually. Two bits are used for each frame type. When the copy criteria for MAC frames is not set to indiscriminate, the controller copies all MAC frames except voids and tokens. In the promiscuous mode, all frames are copied but not tokens.

In FIG. 8, an I-MAC flow control register is shown and only applies to I-MAC queues. Bits 0 to 7 of this register specify the flow control byte that is transmitted when either: threshold has not been reached for an isochronous queue or the isochronous queue is transmitting and became empty.

When the flow control byte is received on the receiving end of a downstream station, a word being built is upstaged. This also terminates receiving any more bytes for that queue. Reception is resumed when the control byte is no longer being received and only at the beginning of the next FDDI-2 cycle. If the control byte being received is not equal to the flow control byte, then the programmable dummy byte is loaded into that queue. This is used to handle "out of sync" problems, where an early (starting delimiter limiter) is received. The dummy byte is loaded until the end of the current FDDI-2 cycle.

In FIG. 8(A) a parity control register is shown and used to enable/disable parity checking/generation and provide odd/even parity select at all the interfaces. After reset, this register is set with odd parity enabled at all the interfaces. This register allows software to verify the functionality of the parity circuits at all of the interfaces in either a diagnostic mode during bring up or in a de-bug session to isolate parity errors.

In FIG. 9, a synchronous bandwidth allocating register is used to manage the bandwidth for the adapter and will be further described in conjunction with FIG. 12.

Event registers record the occurrence of events or a series of events that contribute to generating the interrupt signal. There is a two or three level hierarchy in generating this interrupt signal. At the first level of the hierarchy is a global disable interrupt from a master interrupt mask register, shown in FIG. 10, which serves as global interrupt control and when it is set to a (1) prevents the interrupt signal from ever being asserted. This does not prevent the interrupt register from recording any error that may occur. At the second level of the hierarchy are the mask bits (bits 0–7) of the master interrupt mask register. If one of these bits is set and the corresponding bit in the master interrupt register is set to a "1", then the error has been captured in the master interrupt register but the interrupt signal will not be asserted. The third level of the hierarchy is the mask that corresponds to each individual error in the following registers (not shown): receive/transmit error register, transmit underrun error register, receive overrun error register, parity error/mask register, and system interface error/mask register. If the mask bits are set to "1", then the corresponding error will not set a bit in the master interrupt register and will not generate the interrupt signal. However, the error will be captured in the error register for that particular error.

The Parameter RAM 218 (see FIG. 4) includes queue status registers (all not shown) which are read only registers and provide the status of each queue (receive and transmit). The registers include: A queue empty register; a queue full register; a queue threshold register; queue pointer wrap register; and an almost full register. The queue empty register allows software to know whether each receive and transmit queue is empty/not empty. This register is read only, software can read this register to know whether a queue is empty before disabling it. The Parameter RAM registers are configured in a standard RAM.

The queue full register provides software with a full/not full status indication for each queue. This register is read only. Individual bits are reset when the size and base pointer is loaded to a particular queue, set during the status bit update for FRB writes when the second to last word has been written into the queue and is reset whenever there is room for two or more words.

The queue threshold status register allows software to know which receive or transmit queues are at or above threshold. During every status bit update, the bit for the queue involved will be set when the computed number of words in the queue is equal to or greater than the queue's threshold parameter, or else it will be reset. This register is reset after power on and when software sets the size and base pointer. Transmit threshold queue status bits along with the frame counters are used by the P-MAC transmit to initiate a token capture as well as the starting frame transmission to the ring. Transmit threshold queue status bits are used by the I-MAC to start a queue's transmission to the ring. Receive threshold queue status bits are used by the queue manager to set the receive queue status register bits which tells the SIU that the controller has buffered an adequate number of words for transfer to the system.

The queue pointer wrap register allows software to know which queues are wrapped, that is when the read pointer is larger than the write pointer. The bit is set when the queue's write pointer is updated by the queue's base pointer parameter. This bit is used by the controller's queue manager hardware in calculating the number of words in the queue. A queue almost full status register has bits 0–7 for transmit queues 0–7 respectively. A bit is set during queue status bit updates if the queue has room for less than 65 words. The content of these bits is used to acknowledge the System Interface Unit (SIU) 128 during a transmit operation if the transmit queue being accesses is almost full. These bits are reset by power on, when software sets the size and base pointer in doing queue status bit updates if the queue has room for more than 64 words.

In FIG. 11, the I-MAC steering map table 222 (see FIG. 4) provides the I-MAC receive and transmit interfaces the receive/transmit queue numbers of each isochronous byte. Each byte of the FDDI-2 master cycle is mapped one for one in the steering map, progressing across the cyclic groups, as they are received from the ring. The steering map includes the mapping of the cycle header and the dedicated packet group bytes including the isochronous maintenance channel. The map has 1560 receive/transmit entries. Each steering map entry has 4 bits providing the transmit queue number and 4 bits for the receive queue number, addressing for the IMAC steering registers as shown in FIG. 11(A).

The steering map can map isochronous bytes to any of five (5) isochronous receive queues (queue number 3 through 7) and any of the seven (7) isochronous queues (queue number 0 and 2 through 7). See FIG. 5(A). Queue number routing to isochronous queues are the only valid entries for the steering map. Other values indicate an inactive entry and therefore no receive or transmit routing at the I-MAC engine is provided for that corresponding cycle byte.

Turning to FIG. 12, as words are received from the system interface 128, the packet or multimedia threshold counters 300 and 302 are incremented depending upon whether the word was part of a multimedia or packet frame. The registers 300, 302 (part of Queue Manager 212) are used by software to specify a programmable threshold of received word from SIU 128 and reside in the queue manager 212. The queue manager also controls the counter and comparator that detects threshold on words received. When threshold is reached, the controller 122 initiates a token capture request. The controller will also initiate a token request for any received frame less than a threshold.

The system interface 227 interleaves the transmission of these frames to the controller 122. Upon either reaching the program threshold or receiving one complete frame (for either traffic type), the controller initiates a token Coupled to the registers 300, 302 is a bandwidth control logic unit 304 which consists of a 21-bit holding register 306 and a 21-bit counter 308 used to specify the amount of bandwidth available for synchronous frame transmission. The form of each register is shown in FIG. 9. The counter is enabled after the token has been captured and increments after each byte of a synchronous frame is transmitted; it is never incremented for any other frame type. If MAC 118 does not capture the token, a write to this register loads the holding register as well as the 21-bit counter, otherwise only a holding register is loaded. A bit in this register signifies 80 n.s. of time, which also represents one byte transmitted to the ring. The FDDI standards specify the default maximum amount of synchronous bandwidth to be 165 ms., thus requiring 21-bits for the holding register and counter. This register must be loaded with two's complement value, since the counter is incremented and an over flow occurs when the bandwidth has expired. If the station has used up more than its allotted bandwidth, than an interrupt is generated. Nevertheless the controller completes the current transmission and the counter is disabled. Once the token is released the counter is reloaded with the value in the holding register. The counter is enabled at the next service opportunity. Note each release of the token causes a reload of the counter with the value in the holding register, and a reload is not caused by the counter overflowing capture request to the MAC 118. When the token is captured, all multimedia traffic is transmitted first since that is given higher priority over packet frames, and all multimedia traffic is transmitted up to the allocated amount. Once all multimedia traffic has been transmitted for the bandwidth or the bandwidth for the FDDI station has been used up, packet frames are allowed transmission, provided a token holder timer (not shown) included in the MAC 118 is less than or equal to a target token rotation timer (TTRT) (not shown) also included in the MAC 118. The MAC 118 maintains those timers and counters and indicates this event via a Token Holder Timer Disabled (THDIS) signal. After each packet frame is transmitted, any multimedia frames that may have been received are allowed transmission provided the synchronous bandwidth has not been exceeded. Otherwise, any additional packet frames are transmitted provided THDIS has not been asserted. Once all synchronous bandwidth has been used or the token holder timer has been exceeded, the target rotation time or there are no more frames to transmit, then the token is released. The synchronous bandwidth counter 308 is then reloaded with the contents of the synchronous bandwidth register 306. All of the intelligence for requesting a token and managing the dynamic switching of transmitting different traffic types is contained in the bandwidth control logic 304.

The synchronous bandwidth that is allocated to a station is determined through a FDDI Station Management Protocol. Any station on the ring may request synchronous bandwidth to the bandwidth allocator. If bandwidth is available, the station is granted synchronous packet transmission, up to a maximum time every time the token is captured. To determine the synchronous transmission time, let the maximum allotted time of synchronous transmission be $T_{sync}$ (specified in terms of number of bytes). The station is not allowed to transmit synchronous data after $T_{sync}$. In order to prevent a station from utilizing more than its allocated synchronous multimedia bandwidth, that is transmit synchronous packets after $T_{sync}$, the synchronous register value for register 306 is set to:

$$T_{register} = T_{sync} - T_{max}$$

where $T_{max}$ is the maximum length of a packet. The maximum packet length is known from the application, or can be defaulted to the maximum length allowed by the protocol, typically 4500 bytes. This value of $T_{register}$ permits the completion of transmission of a packet when the synchronous counter expires without ever overrunning the allocated synchronous bandwidth $T_{sync}$. Since the packet being transmitted when the counter expires has a length smaller or equal to $T_{max}$, the bandwidth is not overrun.

Summarizing, as words are received from the host, an asynchronous or synchronous threshold counter is increased depending upon whether the word was part of a synchronous or asynchronous frame. The frames are interleaved. When reaching a program threshold or receiving one complete frame, a token capture is implemented. When a token is captured, all synchronous traffic is transmitted first over asynchronous frames due to a higher priority. Once all synchronous traffic has been transmitted, all asynchronous traffic is transmitted. Asynchronous frames are transmitted provided a token holder timer is less than or equal to a target FDDI station time. In order to prevent a station from utilizing more than its allocated bandwidth, a synchronous register value is set. If the station uses more than its allotted bandwidth while in the middle of transmission, the frame is completed, the counter is disabled; upon release of the token, the counter is reloaded with a value in a holding register. The counter is enabled at the beginning of the next FDDI service opportunity.

Turning to FIGS. 4 and 13, the bandwidth algorithm for the FDDI traffic will now be described. The bandwidth control logic 304 (FIG. 12) is programmed to identify a condition "A" or "B". Condition "A" equals (asynchronous threshold reached) or (1 or more packet frames buffered). Condition "B" equals synchronous threshold reached) or (1 or more synchronous frames buffered). Accordingly, threshold signals inputted to the bandwidth control logic 304 from the register counters 300 and 302 are tested in an operation 500 to determine their presence. A "no" condition places the bandwidth control logic in an active state for the next set of signals. A "yes" condition initiates a token capture operation 502. The token capture operation initiates a signal to the MAC 118 to capture the token on the FDDI network 112. A "no" condition causes the operation 502 to recycle until the token is captured. Once the token has been captured the conditions "A" or "B" are detected in an operation 504. A "no" condition initiates an operation 506 to test for a condition "A" "true" case. A "no" condition for the operation initiates a release of token operation 507. A "yes" condition for the operation 506 initiates a comparison of Token Holder Timers (THT) equal to or greater than Token Target Rotation Timer (TTRT) in an operation 510. A "no" condition for the operation 510 initiates a release of token operation 507. A "yes" condition initiates an operation 512 to transmit one synchronous/asynchronous frame to the FDDI network.

Returning to the operation 504, a "yes" condition initiates a test of the amount of synchronous bandwidth available performed in an operation 514. A "yes" condition initiates the operation 506 which causes the operation 507 to release the token. A "no" condition initiates an operation 516 which erases the synchronous bandwidth counter 308 (see FIG. 12) and enables the transmission of one synchronous frame to the FDDI network. After the frame has been transmitted, an operation 518 disables the synchronous bandwidth counter. An operation 520 is performed to determine whether the conditions are "true". A "no" condition initiates the operation 506 which releases the token. A "yes" condition indicates that the synchronous bandwidth is tested to determine whether it has been expired or not in the operation 514. Synchronous frames continue to be transmitted in the operations 516, 518 until the bandwidth has expired whereupon the operation 506 and 507 release the token.

In summary, the present invention provides minimal system intervention in managing bandwidth on a station in a FDDI network. The two threshold registers 500 and 502 and synchronous bandwidth registers 306, 308 are programmed at start up and control the management of the bandwidth. The registers can be reconfigured at any time if desired.

Once configured, the bandwidth control logic unit 304 manages the traffic to the FDDI ring. Intelligences is provided in the control logic so that multimedia traffic is given higher priority over packet data. Further, the bandwidth control logic can switch back and forth between the two traffic types as frames are received while holding the token, thereby avoiding early release of the token.

The threshold registers 300 and 302 provide a method of capturing the token sooner. Also less memory can be required in the adapter since less of the packet needs to be buffered. The packet can be used to capture the token sooner than otherwise would occur on the network. Furthermore, if the token is captured sooner, the packet gets to the destination station sooner which is more efficient.

While the operation of the invention has been described with respect to a FDDI, the invention can be used for other systems such as ethernet and ATM's. Having described the invention in connection with certain specific embodiments, it is to be understood that further modifications may now suggest themselves to those skilled in the art and it is intended to cover such modifications as falling within the spirit and scope of the present invention and the appended claims.

What is claimed is:

1. In a communications system for transferring real time synchronous and asynchronous data between a network and a host system, a communication adapter for efficient and dynamic management of bandwidth in a station included in the network comprising:

a queue manager including a synchronous data threshold register and counter and an asynchronous data threshold register and counter; the queue manager controlling receiving or transmitting of the synchronous or asynchronous data at a first, a second and a third interfaces while keeping track of the synchronous and asynchronous data stored in separate queues of a storage means;

the first interface coupled between a system bus and the queue manager, the first interface transmitting or receiving synchronous or asynchronous data to/from the host system and the second or the third interface according to instructions received from the host system or the queue manager;

the second interface coupled between the storage means and the queue manager for storing synchronous and asynchronous data in separate queues, as directed by the queue manager;

the third interface coupled between the network and the queue manager; the third interface processing all synchronous or asynchronous data received from the network for the host system or sent to the network by the host system;

bandwidth control logic coupled to the queue manager, and the third interface; the bandwidth control unit specifying the amount of bandwidth available for synchronous data transmission to/from the network and the host system;

means for dynamically switching between the transmission of synchronous and asynchronous data between the host system and the network, in real time, in either direction, while ensuring synchronous and asynchronous data bandwidth are not exceeded; and means for initiating token capture in the network before the synchronous or asynchronous data has been buffered in storage.

2. The communication adapter of claim 1 wherein the means for ensuring synchronous and asynchronous data bandwidths are not exceeded further includes means setting a synchronous bandwidth register to:

$$T_{register} = T_{sync} - T_{max}$$

where:

$T_{register}$=No. of Bytes in the synchronous bandwidth register $T_{sync}$=Allocated Synchronous Transmission Time (Bytes)

$T_{max}$=Maximum Synchronous Packet Length (Bytes).

3. The communications adapter of claim 2 wherein as synchronous or asynchronous packets are received from the system bus the asynchronous or synchronous register and threshold counter is updated, depending upon whether the packet was part of a synchronous or asynchronous frame, and a token capture is initiated upon receiving a complete synchronous or asynchronous frame or a threshold has been exceeded.

4. The communications adapter of claim 3 wherein synchronous data is transmitted first to the network after token capture followed by asynchronous data transmission provided a token holder timer is less than a target token ring timer.

5. The communications adapter of claim 4 wherein the synchronous and asynchronous threshold register and counters are disabled if Tregister is exceeded during the transmission of a frame and the token is released.

6. The communications adapter of claim 5 wherein the third interface includes a media access control and a physical layer interface for token capture and release.

7. The communications adapter of claim 6 wherein the asynchronous threshold register and counter activates the bandwidth control logic when the counter is equal to or exceeds a threshold set into the register.

8. The communications adapter of claim 7 wherein the synchronous threshold register and counter activates the bandwidth control logic when the counter is equal to or greater than a threshold set into the register.

9. The communications adapter of claim 8 wherein the synchronous and asynchronous threshold registers and counters are reloaded with a threshold after a token is released.

10. The communications adapter of claim 9 wherein the bandwidth control logic provides control signals to the synchronous bandwidth counter and a synchronous bandwidth register for managing the transfer of data frames to the network.

11. A method for efficient and dynamic management of bandwidth between a host system and (on) a station in a network comprising the steps of:

(a) defining a condition "A" for transferring synchronous data between the network and the host system when a threshold is reached in a first register for receiving the synchronous data or one or more frames of synchronous data have been buffered in a storage means;

(b) defining a condition "B" for transferring asynchronous data between the network and the host system when a threshold is reached in a second register for receiving the packet data or one or more frames of packet data have been buffered in the storage means;

(c) programming a storage system bandwidth allocation register and counter with the amount of bandwidth available for synchronous and asynchronous data;

(d) initiating capture of a token in the network when condition "A" or "B" has been detected on the system;

(e) testing to determine if condition a "A" or "B" is true;

(f) a "yes" condition initiating a test in the system bandwidth allocation counter to determine if the synchronous system bandwidth has expired;

(g) a "yes" condition for the counter initiating a test for the "B" condition;

(h) a "no" condition for the counter enabling the system bandwidth counter and transmitting one synchronous frame to the network;

(i) disabling the system bandwidth counter and initiating a condition test after transmitting one synchronous frame;

(j) a "yes" condition for an "A" condition test initiating step "(f)";

(k) a "no" condition for the condition test initiating step "(g)";

(l) performing a condition "B" test initiated by step f to determine if a token holder timer (THT) is less than or equal to a target token rotation timer (TTRT);

(m) a "no" condition for the condition "B" test initiating a release of token operation; and (n) a "yes" condition for the condition "B" test initiating a transmission of one asynchronous frame and returning to step "(e)" after transmission of the asynchronous frame.

12. In a communications system for transferring real time synchronous and asynchronous data between a network and a host system, a method for efficient and dynamic management of bandwidth in a station included in the network, comprising the steps of:

a) controlling in a queue manager receiving or transmitting of the synchronous or asynchronous data at a first, a second and a third interfaces while keeping track of the synchronous and asynchronous data stored in separate queues of a storage means;

b) transmitting or receiving at the first interface synchronous or asynchronous data to/from the host system and the second or the third interface according to instructions received from the host system or the queue manager;

c) transferring at the second interface synchronous and asynchronous data into or out of separate queues of the storage means, as directed by the queue manager;

d) processing at the third interface all synchronous or asynchronous data received from the network for the host system or sent to the network by the host system;

e) specifying in a bandwidth control unit the amount of bandwidth available for synchronous data transmission to/from the network and the host system; and f) dynamically switching between the transmission of synchronous and asynchronous data between the host system and the network, in real time, in either direction, while ensuring synchronous and asynchronous data bandwidth are not exceeded.

13. The method of claim 12 further comprising the step of:

g) initiating token capture in the network before the synchronous or asynchronous data has been buffered in the storage means.

14. The communication adapter of claim 1 wherein the queue manager manages a parameter ram which maintains a storage threshold and a read and write pointer for each queue in the storage means.

15. The communications adapter of claim 1 wherein the third interface includes PMAC indicate and request engines and IMAC indicate and request engines for processing asynchronous data from/to the network and processing synchronous data from/to the network, respectively.

16. The communications adapter of claim 15 wherein the PMAC and IMAC indicate and request engines include buffering means for synchronous and asynchronous data transmitted between the host system and the network in either direction.

17. The communications adapter of claim 1 further including a plurality of control registers coupled to a local processor through a local bus, the local processor configuring the registers through the local bus for the storage of synchronous and asynchronous data in the storage means.

18. The communications adapter of claim 1 wherein a Fiber Distributed Data Interface (FDDI) or FDDI 2 or Asynchronous Transfer Mode (ATM) network is coupled to the third interface.

19. The communications adapter of claim 18 wherein the network operates in either a basic mode or a hybrid mode.

* * * * *